(No Model.)
U. REIFFER & J. F. STAUFFER.
GAS TRAP.
No. 506,940. Patented Oct. 17, 1893.
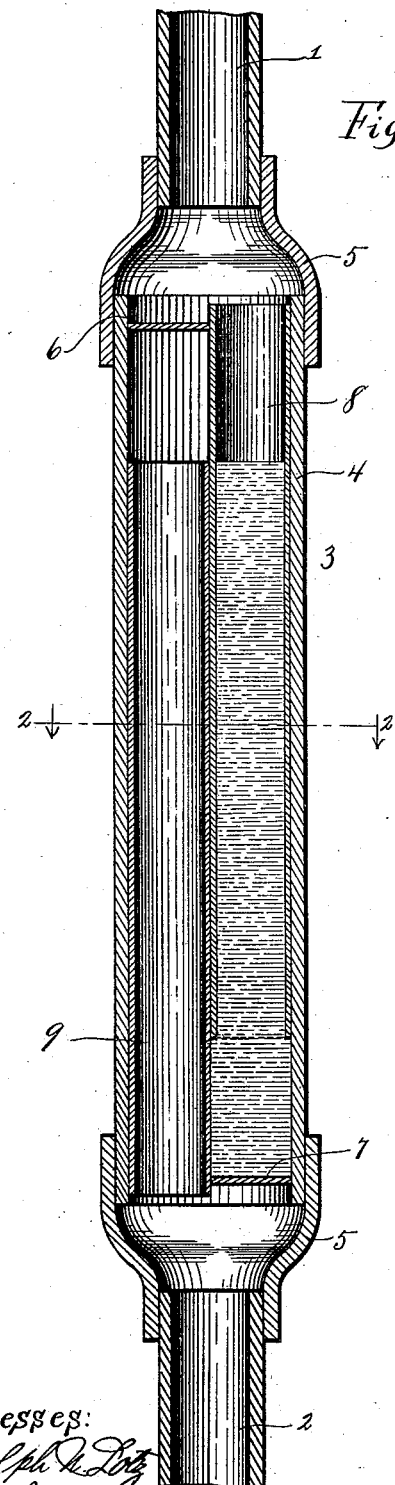
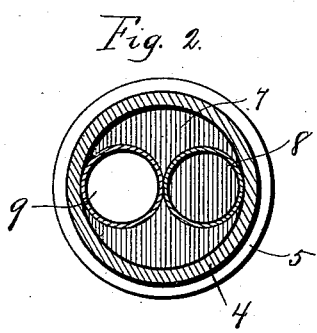
Witnesses:
Rudolph A. Lotz
A. W. Jordan
Inventors
Ulrich Reiffer & John F. Stauffer
By Lotz & Kennedy
Attorneys United States Patent Office.

ULRICH REIFFER AND JOHN F. STAUFFER, OF CHICAGO, ILLINOIS.

GAS-TRAP.

SPECIFICATION forming part of Letters Patent No. 506,940, dated October 17, 1893.

Application filed September 22, 1892. Serial No. 446,635. (No model.)

*To all whom it may concern:*

Be it known that we, ULRICH REIFFER and JOHN F. STAUFFER, residing at Chicago, in the county of Cook and State of Illinois, have invented certain new and useful Improvements in Gas-Traps; and we do hereby declare the following to be a full, clear, and exact description of the invention, such as will enable others skilled in the art to which it appertains to make and use the same.

This invention relates to a novel construction in a trap that is adapted more particularly for use with highly volatile fluids, such as gasoline, and in use is to be interposed in the pipe or passage leading from a tank to the burners to be supplied therefrom.

The object of this invention is to provide such a trap that will effectually prevent the back-flow of gas into the tank from the burner and to prevent the explosion that would be occasioned thereby.

The invention consists in the features of construction and combinations of parts hereinafter fully described and specifically claimed.

In the accompanying drawings illustrating our invention,—Figure 1 is a vertical sectional view of a trap constructed in accordance with our invention. Fig. 2 is a cross section of the same, on the line 2—2.

This invention is intended more particularly for use as a trap to be interposed in a pipe leading from a tank supplying gasoline to the burners of gasoline stoves, furnaces, and the like. In an apparatus of this kind there is always the danger of an explosion that is occasioned when the tank runs empty, whereupon the pipe will be filled with gas which will be ignited from the flame at the burner and will thus cause the explosion, and in the use of a highly volatile fluid such as gasoline there is always great danger from explosion by the back-flow of the gas from the burner to the tank.

In accordance with our invention we interpose a trap in the passage leading from the tank to the burner, and in the accompanying drawings 1 and 2 indicate the end of the pipe or passage through which the fluid passes, and 3 indicates as a whole our improved trap.

Said trap consists of a cylinder or chamber connected at its ends with the ends of the pipes 1 and 2 by couplings 5 and communicating with said pipes 1 and 2. Located near the upper end of said chamber is a partition or diaphragm 6, and located near the lower end of said chamber is a partition or diaphragm 7. The upper partition or diaphragm 6 is provided with an opening at one side of the same, and the pipe 8 opening at both ends passes through said opening in the upper partition and down near the lower end of the chamber. The lower partition 7 is also provided with an opening, and through this opening the end of a tube 9 passes which extends into the chamber 4 and near the upper end thereof, as clearly shown in the drawings. The said tubes 8 and 9 are rigidly secured in the positions shown and tight joints are made between the same and the partitions 6 and 7.

When the gasoline passes from the pipe 1 through the coupling and into the upper end of the cylinder 4, the partition 6 will cause the same to pass into the upper end of the tube 8 and after passing into said tube it will find its way from the lower end thereof into the chamber 4 and will then rise in said chamber around the tubes 8 and 9 and then pass down through the upper end of the tube 9 and thence into the pipe to the burners. In this way it will be seen that the trap will always contain the quantities of the fluid to effect an effectual seal, as the fluid will always stand within the chamber at least to the level of the upper end of tube 9, and to the same level in the tube 8, although when the tank does not run empty the whole trap will be filled. It will be manifest that should the tank run empty the fluid still remaining in the trap will prevent any gas from flowing back from the pipe 2 to the tank, as the fluid within the trap provides a seal to prevent the same.

We claim as our invention—

The upright cylinder or chamber 4 having partitions 6 and 7 near each end thereof and communicating at its ends with pipes or passages 1 and 2, a tube or passage 8 open at both ends and extending from a point above the upper partition 6, through said partition 6 and down near the lower partition 7, and a tube or passage 9 open at both ends and extending from a point below the lower partition 7, through said partition and upward near the upper partition 6, substantially as described.

In testimony whereof we affix our signatures in presence of two witnesses.

ULRICH REIFFER.
JOHN F. STAUFFER.

Witnesses:
RUDOLPH W. LOTZ,
HARRY COBB KENNEDY.